US008041972B2

(12) United States Patent
Jarosinski et al.

(10) Patent No.: US 8,041,972 B2
(45) Date of Patent: Oct. 18, 2011

(54) APPARATUS AND METHOD FOR SETTING WAKEUP TIMES IN A COMMUNICATION DEVICE BASED ON ESTIMATED LOCK ON TIME OF FREQUENCY SYNTHESIZER

(75) Inventors: Tadeusz Jarosinski, San Diego, CA (US); Sreenidhi Raatni, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 867 days.

(21) Appl. No.: 11/695,442

(22) Filed: Apr. 2, 2007

(65) Prior Publication Data

US 2007/0290727 A1   Dec. 20, 2007

Related U.S. Application Data

(60) Provisional application No. 60/789,447, filed on Apr. 4, 2006.

(51) Int. Cl.
*G06F 1/32* (2006.01)
(52) U.S. Cl. .......... 713/323; 455/76; 455/574; 713/330
(58) Field of Classification Search ................. 713/323, 713/324, 330; 455/76, 574
See application file for complete search history.

(56) References Cited

U.S. PATENT DOCUMENTS

| 4,965,533 | A | | 10/1990 | Gilmore |
| 5,982,812 | A | * | 11/1999 | Mensonides et al. ......... 375/215 |
| 6,108,793 | A | * | 8/2000 | Fujii et al. .................... 713/400 |
| 6,622,251 | B1 | | 9/2003 | Lindskog et al. |
| 6,947,721 | B2 | * | 9/2005 | Pritchett et al. ............ 455/343.1 |
| 6,965,271 | B2 | | 11/2005 | Smith |
| 6,968,219 | B2 | | 11/2005 | Pattabiraman et al. |
| 7,027,796 | B1 | | 4/2006 | Linsky et al. |
| 2007/0290727 | A1 | | 12/2007 | Jarosinski et al. |

FOREIGN PATENT DOCUMENTS

| EP | 0361350 | | 4/1990 |
| JP | 6350509 | A | 12/1994 |

(Continued)

OTHER PUBLICATIONS

International Search Report—PCT/US07/065992, International Search Authority—European Patent Office—Oct. 9, 2007.

(Continued)

*Primary Examiner* — Albert Wang
(74) *Attorney, Agent, or Firm* — Ryan Farr

(57) ABSTRACT

Apparatus and methods for setting wakeup times in a communication device are disclosed where setting the wakeup times includes estimating the lock on time of a frequency synthesizer in order to minimize the wakeup time and extend sleep times for maximal energy savings. A disclosed apparatus includes an estimator to receive a current lock on time of a frequency synthesizer, which is the time taken by the frequency synthesizer to lock on to particular frequency after a wakeup signal has been issued to turn on the synthesizer after a sleep period. The estimator calculates a latest estimated lock on time based at least on the current lock on time of the frequency synthesizer and determines an enable signal timing information based on the estimated lock on time. The apparatus also includes a timer configured to receive the enable signal timing information and issue at least one enable signal to turn on other circuitry in the transceiver after the synthesizer lock on period based thereon. Corresponding methods are also disclosed.

58 Claims, 4 Drawing Sheets

FOREIGN PATENT DOCUMENTS

| | | |
|---|---|---|
| JP | 2002217712 A | 8/2002 |
| TW | I241069 | 10/2005 |
| TW | I242329 | 10/2005 |
| TW | I242930 | 11/2005 |

OTHER PUBLICATIONS

Search Report, ROC (Taiwan) Patent Application No. 096112221 (Translation), Dec. 14, 2010, TIPO, Taiwan, ROC.

Patent Cooperation Treaty, Written Opinion of the International Searching Authority, PCT/US2007/065992, Oct. 9, 2007, International Search Authority, European Patent Office, Munich, Germany.

Office Action in Japan application 2009-504457 corresponding to U.S. Appl. No. 11/695,442, citing JP6350509 and JP2002217712 dated Feb. 28, 2011 (050908JP).

* cited by examiner

APPARATUS AND METHOD FOR SETTING WAKEUP TIMES IN A COMMUNICATION DEVICE BASED ON ESTIMATED LOCK ON TIME OF FREQUENCY SYNTHESIZER

CLAIM OF PRIORITY UNDER 35 U.S.C. §119

The present Application for Patent claims priority to Provisional Application No. 60/789,447 entitled "APPARATUS AND METHODS FOR SETTING WAKEUP TIMES IN A COMMUNICATION DEVICE" filed Apr. 4, 2006, and assigned to the assignee hereof and hereby expressly incorporated by reference herein.

BACKGROUND

1. Field

The present application relates to apparatus and methods for setting wakeup times of a communication device that has been put to sleep, and more particularly to minimizing particular settings of wakeup times during a sleep mode cycle by dynamically estimating the settling time of a frequency synthesizer.

2. Background

In certain wireless devices, such as portable wireless devices, it is desirable to utilize battery energy very efficiently in order to provide long service between recharges. In particular wireless devices that operate using burst transmissions, such as in some modes of the code division multiple access (CDMA) and orthogonal frequency division multiplexed (OFDM) systems, given the burst nature of such systems, circuitry can be turned on for a short period of time when the device is actively receiving or transmitting, (i.e., during burst transmission periods) and at least some of the energy consuming circuitry turned off during sleep cycle (i.e., during an idle period). It is desirable to minimize the time that such devices are turned on, including trying to minimize the warm-up time of some components after they are turned on following a sleep period.

It is known that some components, in particular, have disproportionately long wakeup times. One such device is a frequency synthesizer, which may include a phase locked loop (PLL) and other similar devices. The settling or "lock on" time, during which the frequency synthesizer locks on the specified frequency, can take up to several milliseconds. This lock on time is difficult to estimate accurately in advance, because it varies with changing environmental conditions, such as temperature, interference, noise, etc. Notwithstanding, the lock on time needs to be predicted in advance in order for the device to wake up at a precisely specified time coincident with the beginning of a transmission burst. In order to ensure that the frequency synthesizer is locked on prior to receiving a transmission burst, it is known to set a time with an excessive safety margin (e.g., a worst case scenario) within the device's wakeup time-line to account for the somewhat uncertain settling time. Typically, the worst case scenario settling time is set containing the excessive safety margin, which is hard-coded either in software or hardware and used repetitively during consecutive wakeup cycles. By defaulting to the worst case scenario, wakeup times may not be optimized.

SUMMARY

According to an aspect of the present disclosure an apparatus for setting at least one enable signal timing in a communication device is disclosed. The apparatus includes an estimator configured to receive a current lock on time of a frequency synthesizer, which is the time taken by the frequency synthesizer to lock on to particular frequency after a wakeup signal has been issued to turn on the synthesizer after a sleep period. The estimator also is configured to calculate an estimated lock on time based at least on the current lock on time of the frequency synthesizer and to set at least one enable signal timing information based on the estimated lock on time. The apparatus further includes a timer configured to receive the at least one enable signal timing information and issue at least one enable signal to turn on other circuitry in the transceiver after the sleep period based on the at least one enable signal timing information.

According to another aspect of the present disclosure a processor is disclosed that includes an apparatus for dynamically estimating a lock on time of a frequency synthesizer for setting wakeup times in a communication device. In particular, the processor includes an estimator configured to receive a current lock on time of a frequency synthesizer, which is the time taken by the frequency synthesizer to lock on to particular frequency after a turn on signal has been issued to turn on the synthesizer after a sleep period. The processor is also configured to calculate an estimated lock on time based on the current lock on time and at least one past lock on time of the frequency synthesizer. Further, the processor is configured to set at least one enable signal timing information based on the estimated lock on time. The processor further includes a timer configured to receive the at least one enable signal timing information and issue at least one enable signal to turn on other circuitry in the transceiver after the sleep period based on the at least one enable signal timing information.

According to still another aspect of the present disclosure, a method is disclosed for setting at least one enable signal timing in a communication device. The method includes determining a lock on time of a frequency synthesizer after turning on the synthesizer. The method further includes determining an estimated lock on time of the frequency synthesizer based at least on the determined lock time of the frequency synthesizer. Finally, the method includes setting at least one enable signal timing information based on the estimated lock on time.

According to yet another aspect of the present disclosure, an apparatus is disclosed for setting at least one enable signal timing in a communication device. The apparatus includes means for determining a lock on time of a frequency synthesizer after turn on of the synthesizer and means for estimating a latest lock on time of the frequency synthesizer based at least on the determined lock time of the frequency synthesizer. The apparatus further includes means for issuing at least one enable signal based on the estimated lock on time.

According to still one more aspect of the present disclosure, a computer-readable medium encoded with a set of instructions is disclosed where the instructions include an instruction for determining a lock on time of a frequency synthesizer after wakeup of the synthesizer; an instruction for determining an estimated lock on time of the frequency synthesizer based on the determined lock time of the frequency synthesizer; and an instruction for setting at least one enable signal timing information based on the estimated lock on time.

DETAILED DESCRIPTION

The present disclosure includes apparatus and methods that are used to dynamically estimate the lock on time of a frequency synthesizer, such as those used in wireless communication devices. By dynamically estimating the lock on time, the wakeup time required for bringing a wireless communication device out of a sleep mode can be minimized since a variable time corresponding to an accurate lock on time estimate can be set rather than a fixed time with a safety margin as is known in the conventional art.

Figure 1:
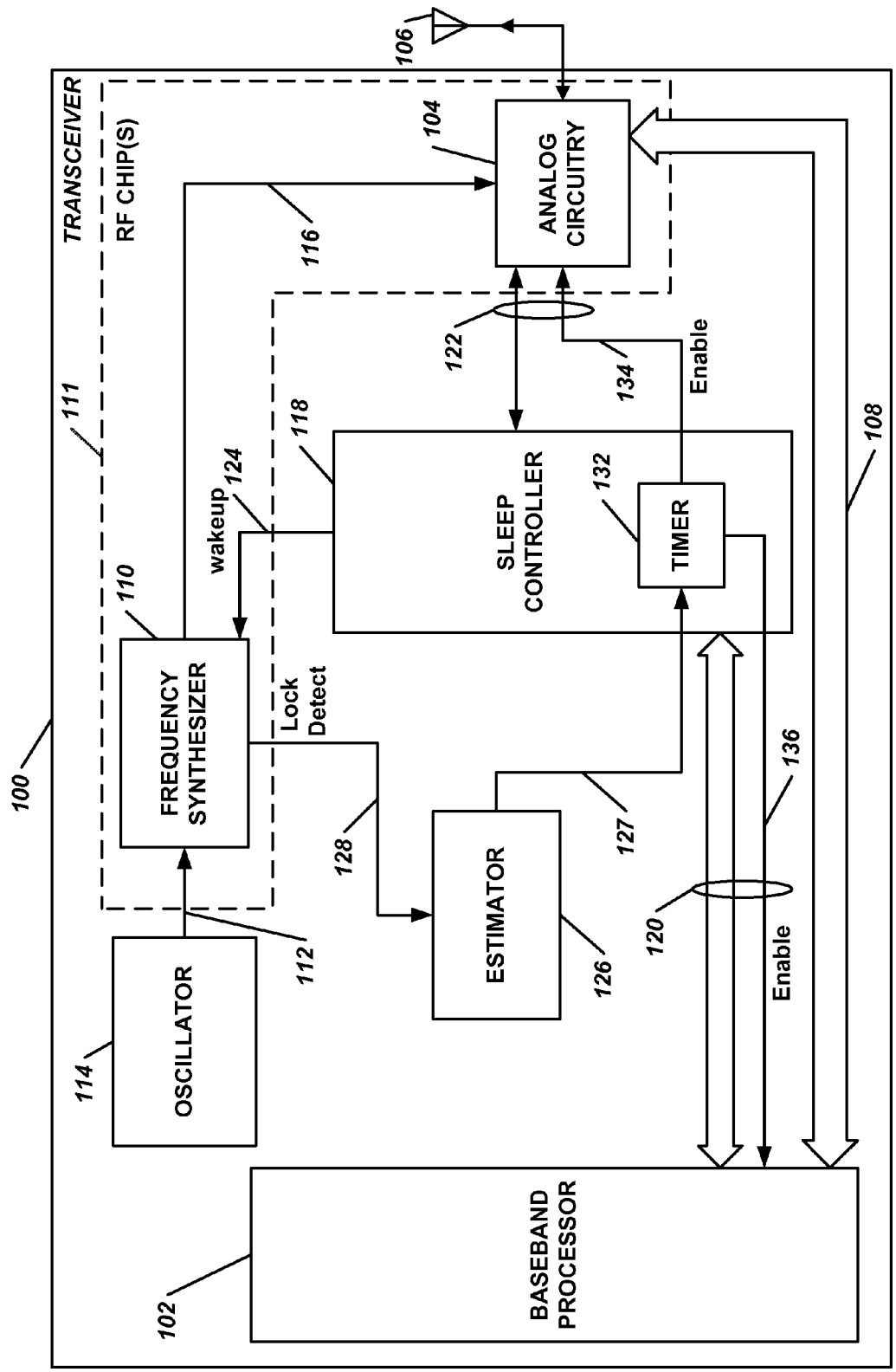
FIG. 1 is a block diagram of an exemplary transceiver including an apparatus for estimating a lock on time of a frequency synthesizer.

FIG. 1 illustrates a transceiver 100, which includes a baseband processor 102 for processing communications signals such as CDMA or OFDM signals. Such signals are received and transmitted using analog circuitry 104, such as RF chip circuitry for wireless reception and transmission via one or more antennas 106. A bi-directional bus 108 transmits the communications signals between the baseband processor 102 and the analog circuitry 104. The bus 108 may be a baseband interface operating according to any suitable interfacing standard or method.

FIG. 1 also illustrates transceiver 100 including a frequency synthesizer 110, which may be part of an RF chip or chips 111 (along with analog circuitry 104) that receives an input reference frequency 112 from an oscillator 114, such as a voltage controlled temperature compensated crystal oscillator (VCTCXO). Based on the input reference frequency, the frequency synthesizer 110, which may include a phase locked loop (PLL) or other similar device, will establish a stable output frequency 116. The analog circuitry 104, such as RF tuner chips, utilize the stable frequency 116 output from the frequency synthesizer 110 in receiving or transmitting wireless communications signals.

Transceiver 100 also features a sleep controller 118 that is used to control the timing of sleep and awake periods for components in the transceiver in order to conserve battery energy, for example. The sleep controller 118 may initiate shutdown and wakeup of various circuits and devices within transceiver 100 including the baseband processor 102 via interface 120 and the analog circuitry 104 via interface 122. Additionally, sleep controller 118 also turns the frequency synthesizer 110 on and off via interface 124. The frequency synthesizer 110 is turned on and off during awake and sleep periods, respectively, for example.

Transceiver 100 also includes an estimator 126 that is used to monitor or detect the settling or lock on time of frequency synthesizer 110 after being turned on by the sleep controller 118, for example. As illustrated in FIG. 1, monitoring or detecting of lock on may be accomplished via a communication connection 128 between frequency synthesizer 110 and estimator 126. The estimator 126, by monitoring the lock on time of the frequency synthesizer 110, can determine the time from the turn on of the synthesizer 110 by a "turn on" or wakeup signal over interface 124 to the time in which the synthesizer 110 locks on or settles to its stable frequency output.

Once the lock on is detected, the estimator 126, then determines a lock on time estimate, which is an estimate of the time in which the synthesizer 110 is expected to lock on reliably (with a statistically good probability of a successful lock) after being turned on next. This estimation may take into account prior or previously determined measurements or estimates of the lock on time from previous sleep cycles in the transceiver 100, which have been effected by the sleep controller 118. It is noted that estimator 126 may be further configured to base the lock on time estimate on current values of the lock on time, such as when no previous lock on time estimates have been determined yet. It is further noted, however, that the accuracy of the estimate of the lock on time is greater with a number of previous lock on times in order to establish a reliable average lock on time. The number of previous lock on time estimates used to estimate the current lock on time estimate, however, is limited in one example so that only a more recent time interval of lock on time estimates is taken into account since the lock on time estimates may trend upwards or downwards over time. Thus, to account for less recent lock on time estimates may not yield a useful lock on time estimate for the current time period.

The estimator 126 may also establish or determine a confidence interval, which is akin to a safety margin and is a statistically and dynamically determined time interval that may be added to the estimated lock on time. Additionally, the estimator 126 may convert the estimated lock on time to a timeout period or periods (also referred herein as "enable timing information"), which are useable by a timer for counting out a time from the issuance of the wakeup signal (124) when an enable signal will enable or turn on digital and analog circuitry to be discussed below.

Estimator 126 outputs the enable timing information via connection 127 to a timer 132. It is noted that the enable timing information may include the added confidence interval, discussed above. The timer 132, in particular, utilizes the enable timing information to count out or determine the time at least one timed output signal (also termed "enable" signal) to first enable or initiate the turn on or wakeup of analog circuitry (e.g, analog circuitry in the RF chip(s) 111) and then next also enable or turn on digital circuitry (e.g., baseband processor 102) within transceiver 100. In the example of FIG. 1, the timer 132 issues a first enable signal 134 via interface 122, for example, to the analog circuitry 104. This enable signal 134 is issued by the timer 132 after a predetermined or set period of time determined based on the enable timing information provided by estimator 126. Accordingly, the enable signal 134 ensures that the RF chips, for example, are not turned on until the frequency synthesizer 110 has locked on to a stable frequency, yet afford minimization of the wakeup time of the analog circuitry 104 after wakeup initiation by the sleep controller 118 (e.g., wakeup signal 124).

The example of FIG. 1 also illustrates another enable signal 136 issued by timer 132 to the baseband processor 102 via the interface 120, for example. This signal 136 may be set to issue at a predetermined time interval after a wakeup signal has been issued (i.e., wakeup signal 124), where the predetermined interval may be based on the enable timing information received from estimator 126. It is noted that in one example; signal 136 is sent to the digital circuitry 102 after the enable signal 134 has been sent to the analog circuitry 104.

It is noted that the latest or most currently available enable timing information used by the timer 132 for determining enable signal timing is based on the estimated lock on time from the previous wakeup cycles. This is because the wakeup signal 124 triggers determination of the next lock on time estimate by waking up the frequency synthesizer 110, and also triggers the timer 132 to start counting out enable signal timing at the same time. Thus, the current lock on time estimate is not available for use by the timer in the current wakeup cycle, and the last or most currently available lock on time estimate must be used instead by timer 132.

It is further noted that although the transceiver 100 in FIG. 1 is illustrated with an estimator 126 which may include a "conversion" of the estimated lock on time to what is termed "enable timing information," one skilled in the art will appreciate that the conversion may not be necessary. That is, the timer 132 and/or sleep controller 118 may be implemented by logic, for example, where the estimated lock on time is output by estimator 126 to the timer 132 and/or sleep controller 118 and converted therein for use in determining the enable timing information used to determine or count out the timing of the enable signals.

Figure 2:
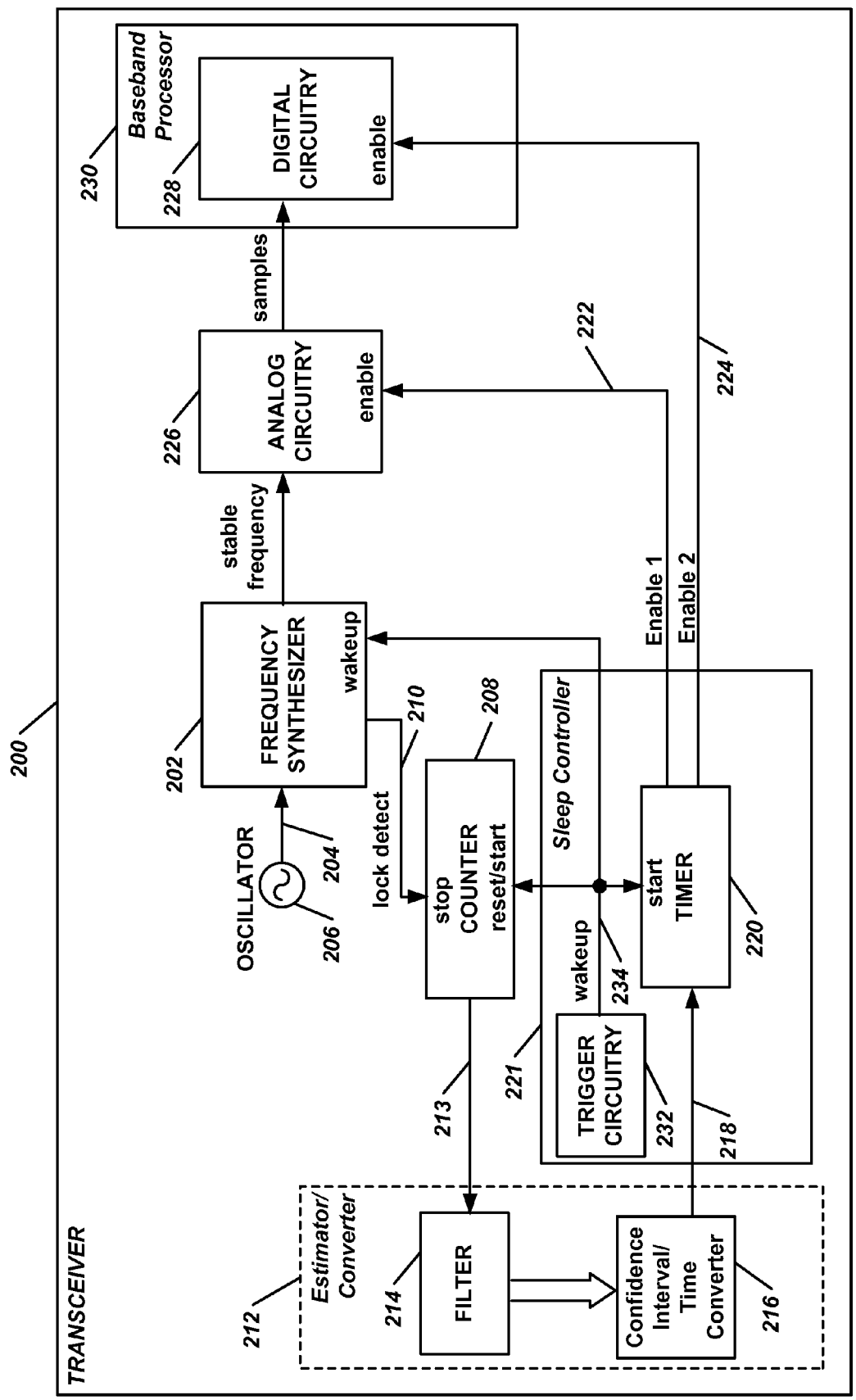
FIG. 2 is a block diagram of another exemplary transceiver including an apparatus for estimating a lock on time of a frequency synthesizer.

FIG. 2 illustrates another example of a transceiver 200 that utilizes an apparatus for minimizing the wakeup time of a wireless transceiver 200, for example. As shown in this example, a frequency synthesizer 202 is included, which receives a signal or input frequency 204 from an oscillator 206. A lock on or lock detect pulse or signal from the synthesizer 202 stops a counter 208 that is connected to synthesizer 202 via a communication connection 210. The counter 208 outputs a time of the lock on of synthesizer 202 to an estimator/converter 212 via connection 213.

In operation, the counter 208 is first reset by a turn on or wakeup signal 234 issued by a sleep controller 221 at wakeup initiation. As may be seen, this wakeup signal 234 also turns on the frequency synthesizer 202 simultaneously. Counter 208 may then count at a predefined timing interval resolution until the lock detect pulse or signal from the synthesizer 202 is received via connection 210, which stops the counter 208. It is noted that this method of determining the lock on time is only exemplary, and one skilled in the art will appreciate that other suitable methods and apparatus for determining the time period of the lock on of the frequency synthesizer 202 may be contemplated. Furthermore, the counter 208 may be implemented separately as shown, or may be part of the estimator/converter 212. Moreover, the counter 208 may be implemented as an up-counter, but is not limited to such type of counter.

Once counter 208 has determined the lock on time the resultant time 213 is output to or read by estimator/converter 212. In particular, the example of FIG. 2 illustrates a filter 214 in estimator/converter 212 that receives the measured lock on time. This filter 214 may be an instantaneous averaging filter, which simply determines an average lock on time within a specified time interval, or may be more complex to calculate some weighted average or some other desired function to establish an accurate estimate of the lock on time of synthesizer 202.

The time value determined by filter 214 may be then input to a confidence interval/time converter 216 within the estimator/converter 212. The confidence interval/time converter 216 first may establish a statistical variance or interval (typically a percentage of lock on time interval), which may be established with a predetermined or desired degree of confidence that the frequency synthesizer 202 will have locked on during the time period set by estimator/converter 212. The confidence interval/time converter 216 then translates or converts that number into the enable timing information used by a timer 220. For example, the confidence interval may be 0.5% of the estimated lock on time, which is then added to the estimated lock on time and translated to a corresponding enable timing information or timeout.

Estimator/converter 212 then determines a lock on time estimate which may include the added confidence time interval, converts that time estimate to one or more enable timing information or timeout(s) and then outputs the enable timing information or timeouts to timer 220 via connection 218. The enable timing information is determined by the estimator/converter 212 by "converting" or correlating the current lock on time estimate information to specific timeout values, that are counted out by timer 220 within a sleep controller 221. The timer 220 utilizes the enable timing information or timing timeout(s) to count out the enable timing and then generate one or more timed enable signals 222 (also labeled as Enable 1) and 224 (also labeled as Enable 2), which are respectively transmitted to enable or wakeup analog circuitry 226 and digital circuitry 228 within a baseband processor 230. The timing of the enable signals 222, 224 is determined based on the expiration of the timer 220 counting based on the received enable or timeout information from the estimator/converter 212.

The sleep controller 221 also includes trigger circuitry 232 that issues a turn on or wakeup signal 234 at the end of a sleep period in order to initiate wake up of certain or all components within transceiver 200. As illustrated, the wake up signal 234 is delivered to the frequency synthesizer 202 to turn on this device after a sleep period. Additionally, the wake up signal 234 is sent to the timer 220 to initiate start of the timer in order to begin counting out the time periods (determined from the enable timing information of the previous wakeup cycles) before each of the enable signals 222 and 224 is issued. Wakeup signal 234 is also input to counter 208 to reset and start the counter 208 as was discussed previously.

As illustrated by FIGS. 1 and 2, the disclosed apparatus affords a transceiver where the wake up time during sleep mode cycles may be minimized because a latest time estimate is determined for the lock on time, thereby dynamically updating the enable time intervals 222 and 224 output by timer 220. That is, the presently disclosed apparatus allows a more accurate and minimized timing to be set for wake up timers rather than simply setting a fixed safety margin, equivalent to the worst case scenario, as is known in the conventional art. By minimizing the wake up time, the sleep time during sleep modes is lengthened, accordingly, thereby leading to greater battery power savings.

It is noted that the estimator/converter 126 or 212 may be implemented in hardware, such as in the baseband processor (102 or 230), or in firmware. Additionally, the estimator/converter 126 or 212 may be implemented using software run on a processor, such as digital signal processor (DSP) or any other suitable processor, such as a general purpose processor (GPP). Furthermore, the estimator may be implemented with the timer in one processor or processing circuit, such as in an application specific integrated circuit (ASIC), or within an ASIC incorporating other circuitry, such as the sleep controller.

Figure 3:
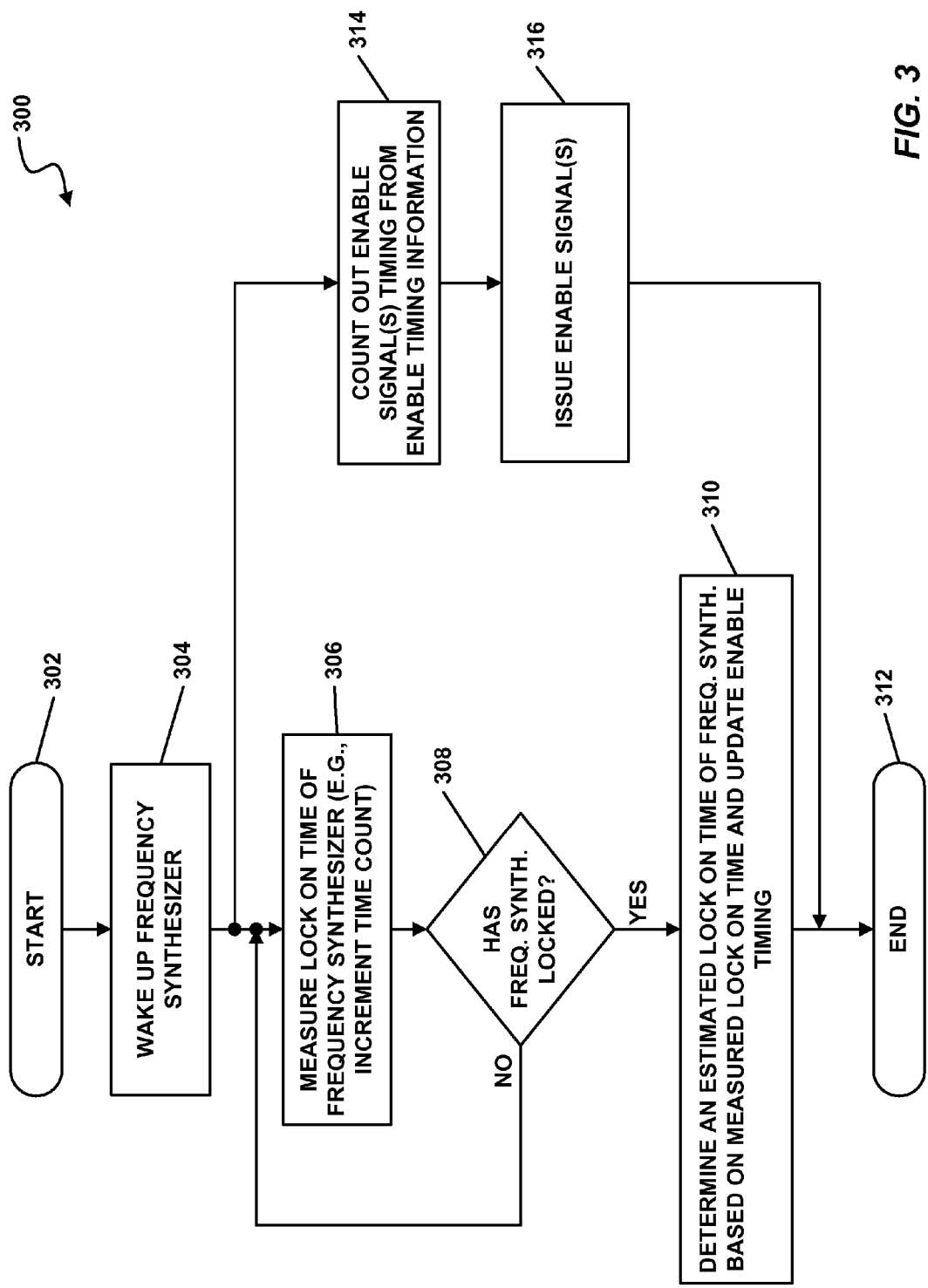
FIG. 3 is a flow diagram of an exemplary method for estimating a lock on time of a frequency synthesizer.

FIG. 3 illustrates a flow diagram of an exemplary method for estimating a lock on time of a frequency synthesizer and setting enable timing based on the estimated lock on time. The process 300 as shown begins at start block 302. Flow then proceeds to block 304 where the frequency synthesizer 304 is woken up or turned on. This part of the process is implemented, for example, by the turn on or wakeup signal 124 in the example of FIG. 1 or the wakeup signal 234 from trigger circuitry 232 in FIG. 2.

After the frequency synthesizer has been started, as indicated in block 304, flow proceeds to block 306. At block 306 measurement of the lock on time of the frequency synthesizer is performed. In a particular example, a time count is incremented from the initiation of the wakeup signal to measure the lock on time, such as with estimator/converter 126 in the example of FIG. 1 or counter 208 as disclosed in the example of FIG. 2.

Flow next proceeds to decision block 308, where a determination is made whether the frequency synthesizer has settled or locked on to a desired frequency. If the synthesizer has not yet locked on, flow loops back to block 306 where measurement of the timing of the lock on time continues. Once the synthesizer has locked on to the desired frequency as determined at block 308, flow then proceeds to block 310. At block 310, a determination of an estimated lock on time of the frequency synthesizer is made based at least on lock on time determined by the estimator/converter 126 or the counter 208, as examples. This estimated lock on time is used (e.g., converted) to update enable signal timing information or timeout(s). It is noted that the process in block 310 may be performed by the estimator/converter 126, or 212 in the previously disclosed examples, which then sends this updated information to the timer 132 or 220 in the sleep controller for counting out the timing for the enable signals, discussed previously. It is further noted that the enable signal timing information will be used in the next sleep cycle since the timer 132 or 220 will already be performing timing simultaneously during a current sleep cycle as will be discussed in the discussion to follow. After block 310, flow proceeds to termination block 312.

Concomitant with the processes of blocks 306 through 310, a concurrent process is executed as part of process 300. This concurrent process starts at block 314, after the wake up of the frequency synthesizer in block 304. At block 314 counting out the timing of when to issue the enable signal or signals is performed. The process in block 314 may be implemented, for example, by timer 132 or 220. Specifically, the timer 132 or 220 utilizes enable signal timing information based on the latest or most current estimated lock on time available at the start of timing initiated by the wakeup signal 124 or 234. It is noted that the latest or most current estimated lock on time available after wakeup will be the latest estimate determined during the preceding sleep cycle since the process 300 is simultaneously determining a next lock on time estimate in blocks 304 to 310, but has not completed the estimate until the synthesizer has locked. The timer (e.g., 220), however, is initiated or started with the wakeup signal (e.g., 234) concurrently at block 314, so the estimated lock on time being determined is not yet available.

After the timer (e.g., timer 132 or 220) has counted out the enable signal timing, flow proceeds to block 316, where the one or more enable signals (134, 136, 222, or 224) are issued to analog 104, 226 and digital 102, 228 circuitry within the transceiver. It is noted that in one example the enable signal timing information is different for the analog and digital circuitry. For example, the enable signal issued to the analog circuitry is sent prior to the enable signal issued to the digital circuitry. After the enable signals are issued in block 316, flow proceeds to block 312 where process 300 terminates.

It is noted that the process 300 may be repeatedly performed during each wakeup period of a sleep cycle, even though this is not explicitly illustrated in the example of FIG. 3.

Figure 4:
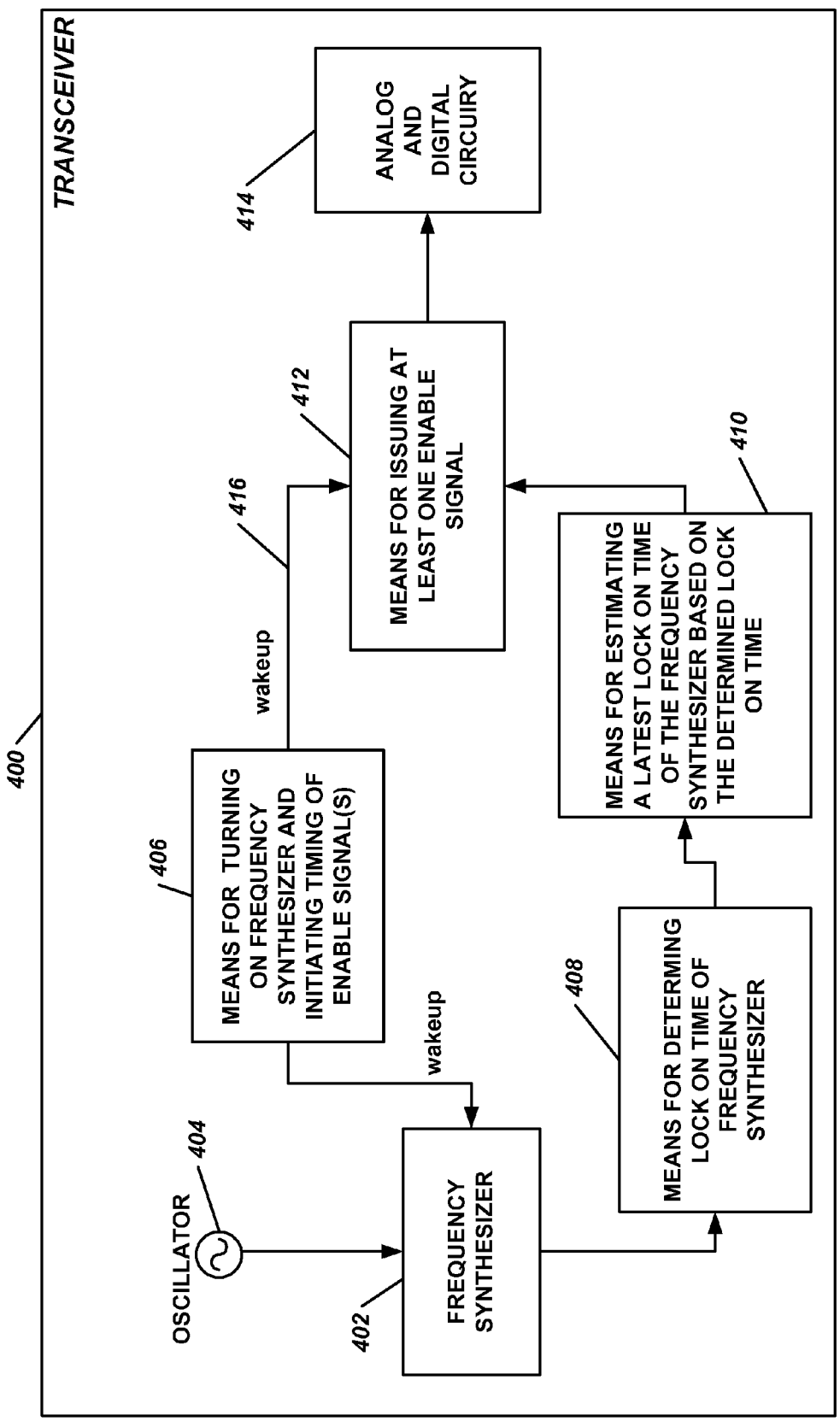
FIG. 4 is a block diagram of yet another exemplary transceiver including an apparatus for estimating a lock on time of a frequency synthesizer.

FIG. 4 is a block diagram of yet another exemplary transceiver including an apparatus for estimating a lock on time of a frequency synthesizer. As illustrated, the transceiver 400 includes a frequency synthesizer 402, which receives a reference frequency from an oscillator 404. The transceiver further includes means 406 for turning on the frequency synthesizer (e.g., trigger circuitry 232 issuing the wakeup signal 234), such as after a sleep period and initiating timing of when to issue the enable signals through wakeup signal 416 (e.g. the sleep controller 118 or the trigger circuitry 232 also delivering the wakeup signal 124 or 234 to start the timer 132 or 220 as shown in FIGS. 1 and 2).

Connected to the frequency synthesizer 402 is means 408 for determining a lock on time of the synthesizer 402. Means 408 may implemented, for example, by counter 208 and connection 210 as illustrated in the example of FIG. 2. Once means 408 determines the current lock on time of synthesizer 402, this information is transmitted to means 410 for estimating a lock on time of the frequency synthesizer based at least on the determined current lock on time. An exemplary implementation of means 410 may include estimator 126 or estimator/converter 212 illustrated in FIGS. 1 and 2.

A resultant latest lock on time determined by means 410 is delivered to means 412 for issuing at least one enable signal based on the estimated latest lock on time. Means 412 may be implemented by, as an example, the estimator 126 or estimator/converter 212, which determines the enable signal timing information, and the timer 220 or timer 132, which utilizes the timeout or wakeup timing information from estimator/converter 212 or estimator 126 to count or measure the particular time periods based on the enable signal timing information to determine when to issue the timeout or enable signals, as discussed previously. The timing of the issuance of the enable signals are thereby dynamically set based at least on current lock on time information, and are used to initiate wakeup (e.g., enable signals 222, 224) of analog and digital circuitry 414 in the transceiver 400.

As described above, the presently disclosed apparatus and methods afford dynamic estimation of the lock on time of a frequency synthesizer, such as those used in wireless communication devices. By dynamically estimating the lock on time, the wakeup time required for bringing a wireless communication device out of a sleep mode is minimized since a variable time corresponding to an accurate lock on time estimate can be set rather than a worst case fixed time with a safety margin as is known in the conventional art.

The methods or algorithms described in connection with the examples disclosed herein may be embodied directly in hardware, in a software module executed by a processor, firmware, or in a combination of two or more of these. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. The word "exemplary" is used exclusively herein to mean "serving as an example, instance, or illustration." Any example described herein as "exemplary" is not necessarily to be construed as preferred or advantageous over other examples. Accordingly, the novel aspects described herein is to be defined solely by the scope of the following claims.

What is claimed is:

1. An apparatus for setting at least one enable signal timing in a communication device, the apparatus comprising:
an estimator configured to receive a current lock on time of a frequency synthesizer, which is the time taken by the frequency synthesizer to lock on to a particular frequency after a wakeup signal has been issued to turn on the synthesizer after a sleep period, to calculate an estimated lock on time based on at least the current lock on time of the frequency synthesizer and at least one previously determined lock on time of the frequency synthesizer, and to set at least one enable signal timing information based on the estimated lock on time.

2. The apparatus as defined in claim 1, further comprising:
a timer configured to receive the at least one enable signal timing information and issue at least one enable signal to turn on other circuitry in the communication device after the sleep period based on the at least one enable signal timing information.

3. The apparatus as defined in claim 1, further comprising:
a counter configured to determine the current lock on time of the frequency synthesizer to lock on to the particular frequency after the wakeup signal has been issued.

4. The apparatus as defined in claim 1, wherein the estimator further includes a converter configured to set the at least one enable signal timing information based on the estimated lock on time by converting the estimated lock on time to time information usable by a timer for counting out an enable signal.

5. The apparatus as defined in claim 1, wherein the estimator further comprises: a filter configured to determine an average lock on time; and
a confidence interval determination unit configured to receive the average lock on time and determine a desired confidence interval time based on the average lock on time that is configured to be added to the estimated lock on time.

6. The apparatus as defined in claim 5, wherein the filter is an instantaneous averaging filter.

7. The apparatus as defined in claim 1, wherein the estimator is part of an application specific integrated circuit.

8. The apparatus as defined in claim 1, further comprising:
a processor configured to execute a set of instructions implementing the estimator.

9. The apparatus as defined in claim 1, further comprising a sleep controller that includes the timer.

10. The apparatus as defined in claim 1, further comprising a trigger circuitry configured to issue the wakeup signal, wherein the timer is triggered to start enable signal timing with the wakeup signal.

11. The apparatus as defined in claim 1, wherein the frequency synthesizer includes a phase locked loop.

12. The apparatus as defined in claim 1, wherein the timer is configured to issue the at least one enable signal to include first and second enable signals where the first enable signal is sent to analog circuitry to wakeup the analog circuitry of the other circuitry prior to the second enable signal that is sent to digital processing circuitry of the other circuitry.

13. The apparatus as defined in claim 12, wherein the analog circuitry includes an RF tuner.

14. The apparatus as defined in claim 12, wherein the digital circuitry includes a baseband transceiver circuit.

15. A processor including an apparatus for dynamically estimating a lock on time of a frequency synthesizer for use in setting wakeup times in a communication device, the apparatus comprising:
an estimator configured to receive a current lock on time of a frequency synthesizer, which is the time taken by the frequency synthesizer to lock on to a particular frequency after a wakeup signal has been issued to turn on the synthesizer after a sleep period, to calculate an estimated lock on time based on the current lock on time and at least one past lock on time of the frequency synthesizer, and to set at least one enable signal timing information based on the estimated lock on time.

16. The processor as defined in claim 15, further comprising:
a timer configured to receive the at least one enable signal timing information and issue at least one enable signal to turn on other circuitry in the communication device after the sleep period based on the at least one enable signal timing information.

17. The processor as defined in claim 15, further comprising:
a counter device configured to determine a current lock on time of the frequency synthesizer to lock on to the particular frequency after the wakeup signal has been issued.

18. The processor as defined in claim 15, wherein the estimator further includes a converter configured to set the at least one enable signal timing information based on the estimated lock on time by converting the estimated lock on time to time information usable by a timer for counting out an enable signal.

19. The processor as defined in claim 15, wherein the estimator further comprises:
a filter configured to determine an average lock on time; and
a confidence interval determination unit configured to receive the average lock on time and determine a desired confidence interval time based on the average lock on time that is configured to be added to the estimated lock on time.

20. The processor as defined in claim 19, wherein the filter is an instantaneous averaging filter.

21. The processor as defined in claim 15, wherein the estimator is a hardware circuit.

22. The processor as defined in claim 15, wherein the processor is further configured to execute a set of instructions implementing the estimator.

23. The processor as defined in claim 15, further comprising a sleep controller that includes the wakeup timer.

24. The processor as defined in claim 15, further comprising a trigger circuitry configured to issue the wakeup signal, wherein the timer is triggered to start enable signal timing with the wakeup signal.

25. The processor as defined in claim 15, wherein the frequency synthesizer includes a phase locked loop.

26. The processor as defined in claim 15, wherein the timer is configured to issue the at least one enable signal to include first and second enable signals where the first enable signal is sent to analog circuitry to wakeup the analog circuitry of the other circuitry prior to the second signal that is sent to digital processing circuitry of the other circuitry.

27. The processor as defined in claim 26, wherein the analog circuitry includes an RF tuner.

28. The processor as defined in claim 26, wherein the digital circuitry includes a baseband transceiver circuit.

29. A method for setting at least one enable signal timing in a communication device, the method comprising:
   determining a current lock on time of a frequency synthesizer after wakeup of the synthesizer;
   determining an estimated lock on time of the frequency synthesizer based at least on the determined current lock time of the frequency synthesizer and at least one previously determined lock on time of the frequency synthesizer; and
   setting at least one enable signal based on the estimated lock on time.

30. The method as defined in claim 29, wherein determining the lock on time of the frequency synthesizer includes counting time periods at a timing resolution from initiation of the frequency synthesizer after wakeup to when the synthesizer locks on to a prescribed frequency.

31. The method as defined in claim 29, wherein determining the estimated lock on time further comprises:
   determining an average lock on time based on at least one previously determined lock on time of the frequency synthesizer and the current lock on time; and
   determining a desired confidence interval time based on the average lock on time.

32. The method as defined in claim 29, further comprising:
   setting first and second enable signal timing information based on the estimated lock on time; and
   issuing at least first and second enable signals based respectively on the first and second enable signal timing information, where the first enable signal is sent to analog circuitry to wakeup the analog circuitry of the other circuitry prior to the second enable signal that is sent to digital processing circuitry of the other circuitry.

33. The method as defined in claim 32, wherein the analog circuitry includes an RF tuner.

34. The method as defined in claim 32, wherein the digital circuitry includes a baseband transceiver circuit.

35. The method as defined in claim 32, further comprising:
   receiving the at least one enable signal timing information; and
   issuing at least one enable signal to turn on other circuitry in the communication device after the sleep period based on the at least one enable signal timing information.

36. The method as defined in claim 32, further comprising:
   setting the at least one enable signal timing information based on the estimated lock on time by converting the estimated lock on time to time information for counting out an enable signal.

37. The method as defined in claim 29, further comprising:
   issuing the wakeup signal to start enable signal timing information with the wakeup signal.

38. The method as defined in claim 29, wherein the frequency synthesizer includes a phase locked loop.

39. An apparatus for setting at least one enable signal timing in a communication device, the apparatus comprising:
   means for determining a lock on time of a frequency synthesizer after wakeup of the synthesizer;
   means for estimating a lock on time of the frequency synthesizer based at least on the determined lock time of the frequency synthesizer and at least one previously determined lock on time of the frequency synthesizer; and
   means for issuing at least one enable signal based on the estimated lock on time.

40. The apparatus as defined in claim 39, wherein the means for determining the lock on time of the frequency synthesizer includes means for counting time periods at a timing resolution from initiation of the frequency synthesizer after wakeup to when the synthesizer locks on to a prescribed frequency.

41. The apparatus as defined in claim 39, wherein the means for estimating the lock on time further comprises:
   means for determining an average lock on time; and
   means for determining a desired confidence interval time based on the average lock on time.

42. The apparatus as defined in claim 39, wherein the means for issuing at least one enable signal further comprises:
   means for issuing at least first and second enable signals based respectively on first and second enable signal timing information, where the first enable signal is sent to analog circuitry to wakeup the analog circuitry of the other circuitry prior to the second enable signal that is sent to digital processing circuitry of the other circuitry.

43. The apparatus as defined in claim 42, wherein the analog circuitry includes an RF tuner.

44. The apparatus as defined in claim 42, wherein the digital circuitry includes a baseband transceiver circuit.

45. The apparatus as defined in claim 42, further comprising:
   means for receiving the at least one enable signal timing information; and
   means for issuing at least one enable signal to turn on other circuitry in the communication device after the sleep period based on the at least one enable signal timing information.

46. The apparatus as defined in claim 42, further comprising:
   means for setting the at least one enable signal timing information based on the estimated lock on time by converting the estimated lock on time to time information for counting out an enable signal.

47. The apparatus as defined in claim 39, further comprising:
   means for issuing the wakeup signal to start enable signal timing information with the wakeup signal.

48. The apparatus as defined in claim 39, wherein the frequency synthesizer includes a phase locked loop.

49. A computer-readable storage medium encoded with a set of instructions, the instructions comprising:
   an instruction for determining a lock on time of a frequency synthesizer after wakeup of the synthesizer;
   an instruction for determining an estimated lock on time of the frequency synthesizer based at least on the determined lock time of the frequency synthesizer and at least one previously determined lock on time of the frequency synthesizer; and
   an instruction for setting at least one enable signal timing information based on the estimated lock on time.

50. The computer readable storage medium as defined in claim 49, wherein determining the lock on time of the frequency synthesizer includes counting time periods at a timing resolution from initiation of the frequency synthesizer after wakeup to when the synthesizer locks on to a prescribed frequency.

51. The computer readable storage medium as defined in claim 49, wherein determining the estimated lock on time further comprises:
   an instruction for determining an average lock on time based on at least one previously determined lock on time of the frequency synthesizer and the determined lock on time; and
   an instruction for determining a desired confidence interval time based on the average lock on time.

52. The computer readable storage medium as defined in claim 49, further comprising:
- an instruction for setting first and second enable signal timing information based on the estimated lock on time; and
- an instruction for issuing at least first and second enable signals based respectively on the first and second enable signal timing information, where the first enable signal is sent to analog circuitry to wakeup the analog circuitry of the other circuitry prior to the second enable signal that is sent to digital processing circuitry of the other circuitry.

53. The computer readable storage medium as defined in claim 52, wherein the analog circuitry includes an RF tuner.

54. The computer readable storage medium as defined in claim 52, wherein the digital circuitry includes a baseband transceiver circuit.

55. The computer readable storage medium as defined in claim 52, further comprising:
- an instruction for receiving the at least one enable signal timing information; and
- an instruction for issuing at least one enable signal to turn on other circuitry in the communication device after the sleep period based on the at least one enable signal timing information.

56. The computer readable storage medium as defined in claim 52, further comprising:
- an instruction for setting the at least one enable signal timing information based on the estimated lock on time by converting the estimated lock on time to time information for counting out an enable signal.

57. The computer readable storage medium as defined in claim 49, further comprising:
- an instruction for issuing the wakeup signal to start enable signal timing with the wakeup signal.

58. The computer readable storage medium as defined in claim 49, wherein the frequency synthesizer includes a phase locked loop.

* * * * *